Patented June 24, 1947

2,422,666

UNITED STATES PATENT OFFICE 2,422,666

POLYCARBONAMIDES MODIFIED BY CHROMIC SALTS

Calvin S. Fuller, Chatham, N. J., assignor to Bell Telephone Laboratories, Incorporated, New York, N. Y., a corporation of New York No Drawing. Application June 20, 1942, Serial No. 447,837

7 Claims. (Cl. 260—78)

This invention relates to synthetic linear polyamides, and more particularly to the treatment of such polyamides to improve their properties.

Synthetic linear polyamides, to the improvement of which the present invention pertains, have long chain linear molecules made up of organic bivalent radicals connected together in the molecular chains by linkages, hereinafter termed amide linkages, containing the amide group —CO—N=, although some of the linkages between the bivalent organic radicals may include other groups, such as ester groups. Such linear polyamides are in general formed by condensation of suitable bifunctional reactants; thus they may be formed by heating under polyamide-forming conditions an amino acid, or a suitable diamine with a suitable dibasic acid, or amide-forming derivatives of such reactants, or one or more other polyamide-forming reactants. However, the term "polyamide" as applied to synthetic linear polymers to the improvement of which the present invention is directed not only embraces polyamides prepared from polyamide-forming reactants only, including interpolyamides prepared from mixtures of such reactants, but also embraces other synthetic linear polymers having amide groups in the main chains, as contrasted to side chains, of the linear molecules, the amide linkages constituting substantial proportions of the linkages present. The polyesteramides are examples of such other polyamides.

Moreover, the term "linear" as applied to the synthetic polyamides to the improvement of which the present invention pertains not only includes strictly linear synthetic polyamides but also synthetic polyamides which are essentially linear; that is, polyamides which have molecules which are essentially linear but which may have some branching or cross-linking, which polyamides are nevertheless fusible and soluble.

The synthetic linear polyamides to the improvement of which the present invention is directed may have various physical characteristics. They may be microcrystalline solids at ordinary temperatures and have sufficient strength and toughness to be formed into sheets, films, threads or fibers. Such microcrystalline polyamides may be capable of being cold worked, that is, capable of being subjected to a tensile or compressive stress which will cause orientation in the direction of stress with attendant increases in strength, toughness and flexibility; for example, threads or fibers of such polyamides may be cold drawn, that is, subjected at ordinary temperatures to a tensile stress which causes the threads or fibers to become permanently elongated and permanently increased in strength, toughness and pliability.

In general, microcrystalline polyamides are those which have straight chain molecules with substantially no side substituents on the bivalent radicals or on the nitrogen atoms in the molecules. Examples are polyamides formed of aliphatic bivalent radicals connected together by amide linkages in the chain, although in some cases polyamides having cyclic groups or some substituents other than hydrogen on the bivalent radicals or on the nitrogen atoms may be microcrystalline. Polyamides of higher molecular weight are in general tougher than those of lower molecular weight. Moreover, the property of being capable of cold working exists only in microcrystalline polyamides which are of a high molecular weight; in general at least of a molecular weight of 7,000 to 10,000 as determined by viscosity methods.

The polyamides to the improvement of which the present invention is directed may also be non-crystalline, amorphous solids or liquids at ordinary temperatures, even at higher molecular weights. Such synthetic linear polyamides in general are amorphous because their molecules contain cyclic groups in the chain, or because they contain side substituents in the bivalent radicals or on the nitrogen atoms, or both, which impede crystallization.

Moreover, synthetic linear polyamides to the improvement of which the present invention pertains which are microcrystalline or amorphous solids at ordinary temperatures in general are fusible at elevated temperatures because their linear molecules are not cross-linked by primary valence bonds.

Furthermore, synthetic linear polyamides to the improvement of which the present invention is directed in general are soluble to a greater or less extent, if not in water then in certain organic solvents. Certain of such polyamides, in general those formed of hydrocarbon bivalent radicals between the amide linkages, such as aliphatic radicals, are practically insoluble in water but are soluble in certain polar solvents, such as cresol, formamide, chloroform, certain alcohols, or mixtures thereof. Other polyamides are more or less soluble in water; in general, such water-soluble polyamides have linear molecules containing one or more hetero atoms in the bivalent radicals of the linear molecules, particularly atoms of the oxygen family.

According to the present invention the properties of a polyamide of the kinds indicated above may be improved by treating it with a small amount of metal salt which is soluble in the polyamide and which is capable of readily forming an ammine, e. g., a complex metal-ammonia compound in which one or more ammonia molecules are associated with the metal by residual valence forces, which ammine is stable at room temperatures and also, for increased advantages, at elevated temperatures. The salt should be non-reactive with the polyamide, in the sense that the salt does not chemically combine with the polyamide by primary valence forces and does not have an oxidizing action thereon.

The salt employed according to the present invention should be capable of being finely dispersed in the polyamide and hence should be at least appreciably soluble in the polyamide. It appears that all salts which are sufficiently soluble in the polyamide for the purposes of the invention are at least fairly soluble in liquids having a solvent action on the polyamide so that a salt which is fairly soluble in a liquid having a solvent action on the polyamide is sufficiently soluble in the polyamide for the purposes of the invention. A liquid having a solvent action on the polyamide for the purposes of the invention is a liquid which dissolves the polyamide entirely or has an appreciable swelling action thereon.

The salts employed according to the invention are substantially ionizable and when employed according to the invention are probably in the ionized condition because of water present in the polyamide or in a liquid in which the salt may be dissolved when it is applied to the polyamide, or because such liquid, even if not aqueous, may act as an ionizing solvent.

Examples of salts capable of readily forming ammines stable at ordinary and elevated temperatures, and sufficiently soluble in synthetic linear polyamides to be employed according to the present invention are: chromic chloride, $CrCl_3 \cdot 6H_2O$; chromic acetate, $Cr(C_2H_3O_2)_3 \cdot H_2O$; ferric sulfate $Fe_2(SO_4)_3 \cdot 9H_2O$; ferric chloride, $FeCl_3 \cdot 6H_2O$; cobaltic acetate, $Co(C_2H_3O_2)_3 \cdot 4H_2O$; calcium chloride $CaCl_2$; lithium chloride $LiCl$; and manganous chloride $MnCl_2$. Chromic salts, of which chromic chloride and chromic acetate are examples, which are soluble in the polyamide appear to provide the most powerful and most advantageous effects according to the present invention.

In general, mere contact of the finely dispersed salt with the polyamide will produce the results hereinafter indicated in the absence of a solvent for the polyamide. The treatment of a polyamide with a salt according to the invention causes the polyamide to become tougher and less fusible; that is, the melting point of the polyamide is substantially raised. Indeed, the polyamide may be rendered substantially infusible so that upon sufficient elevation of the temperature it will decompose without flowing, although it may become less opaque at elevated temperatures. In general, the solubility of the polyamide is not affected by treatment according to the invention.

The mechanism of the action of the salt on the polyamide according to the invention is not definitely understood, but apparently involves the formation of coordination complexes between the cations of the salt and the nitrogen atoms of the amide groups of the polyamide through the agency of residual valences, which coordination complexes apparently bind the molecules of the polyamide together and hence reduce the fusibility of the polyamide. Evidence of the formation of such coordination complexes is provided by the fact that the reduction in fusibility is in general removed when the salt is removed from the polyamide, as by dissolving or leaching.

The polyamides which are initially microcrystalline solids at ordinary temperatures but which are fusible at elevated temperatures are after treatment according to the invention still microcrystalline solids but have their melting points substantially elevated or are rendered infusible. The treated polyamides, moreover, are tougher and usually harder than the original polyamides.

Polyamides which are initially amorphous solids but which are fusible at elevated temperatures are after treatment according to the present invention flexible, amorphous solids of substantially greater strength and toughness than before treatment and have their melting points substantially raised or are rendered infusible.

Polyamides which are initially liquid at ordinary temperatures, after treatment according to the invention either are liquids of a substantially greater viscosity or are transformed into rubber-like elastic solids.

While treatment with salts according to the invention provides substantial increases in infusibility when applied to polyamides of a wide range of molecular weights, and even when applied to polyamides of low molecular weights, in general the most advantageous results are obtained when the polyamides treated according to the invention are of a molecular weight sufficiently high to correspond to an intrinsic viscosity of at least about 0.2, where intrinsic viscosity is defined as $$V = \frac{\log_e N_R}{C}$$

wherein $N_R$ is the viscosity of a dilute solution of a polyamide in a suitable solvent such as meta-cresol, divided by the viscosity of the solvent in the same units and at the same temperatures and C is the concentration of the polyamide in 100 cubic centimeters of solution. In general, the strength and toughness of a polyamide increases with intrinsic viscosity and polyamides having an intrinsic viscosity of at least about 0.2 form more useful solid bodies than do those of lower intrinsic viscosity. Particularly advantageous results are obtained when the treatment of the invention is applied to polyamides having an intrinsic viscosity of at least 0.4, corresponding to a molecular weight of 7,000 to 10,000. A polyamide having a molecular weight corresponding to such an intrinsic viscosity, if of microcrystalline nature, in general has cold working properties which render it advantageous for many uses.

The amount of salt employed may vary widely, an excess being usually employed. In general, advantageous results are obtained when the amount of salt employed is such that the amount of cation present in the salt lies between about 0.5 per cent and about 5 per cent by weight of the polyamide, amounts over about 5 per cent being, in general, unnecessarily excessive, although for amounts below this figure the degree of infusibility achieved with a given salt increases with the amount of salt. The actual amount of salt employed is largely determined by the nature of the salt employed, by the nature of the polyamide which is to be treated, and by the results desired. Thus, for a given result, a smaller amount of a salt which more readily forms an ammine may be employed than a salt which is less powerful in this respect. Chromic salts, such as chromic chloride and chromic acetate, are examples of those which provide strong effects according to the present invention, and smaller amounts of such salts may be employed for a given result than other salts such as ferric sulfate, cobaltous acetate, or the like. Again, if the polyamide is such that a large proportion or all of the nitrogen atoms of its amide linkages have substituents other than hydrogen, the effects provided according to the invention are less than if all such nitrogen atoms had hydrogen as the substituent; furthermore, larger substituents such as cyclo-hexyl groups reduce the effects of the invention more than do the smaller substituents such as methyl groups. For a given result, it is generally necessary to employ less of a given salt when the polyamide has no substituents other than hydrogen on the nitrogen atoms. If it is desired to render the polyamide infusible, more salt must be employed than when the melting point of the polyamide is raised but the polyamide remains fusible.

Various modes of treating the polyamide with a salt according to the invention may be employed. One advantageous procedure is to form a solution of the polyamide and the salt in a liquid which is a solvent for the polyamide and for the salt and to mix the salt intimately with the polyamide. After the polyamide has been formed into the desired shape or article, as after it has been formed into a fiber, cast into a sheet, applied to a surface as a film, or employed as an impregnant, the liquid is evaporated. The removal of the liquid by evaporation causes the polyamide to become less fusible or even wholly infusible. In some cases, mild heating of the polyamide may be advantageous in promoting the reduction of fusibility, particularly if the salt is one which requires heating to form an ammine.

According to another procedure, the salt while dissolved in a suitable liquid having a solvent action on the polyamide is applied to a previously shaped polyamide article; in such case, penetration of the salt into the polyamide is facilitated. Removal of the liquid, as by evaporation, causes the polyamide to become less fusible or infusible, although as indicated above, mild heating may be desirable. Fibres, sheets, films in the form of coatings, polyamide impregnated articles and other polyamide articles may thus be contacted with the salts by brushing, dipping, spraying or the like. Contact of the polyamides with the salts may also be accomplished directly in the preparation of shaped articles, such as sheets or threads. Thus, the liquid polyamide either in the form of a solution or in the molten condition may be extruded in the desired predetermined shape, as from a nozzle, into a bath or liquid having the salt dissolved therein and having a solvent action on the polyamide. Evaporation of the liquid in each case will cause the decrease in fusibility of the polyamide. The duration of the treatment will largely depend upon the amount and kind of salt employed upon the kind of liquid employed, and upon the degree of the effect desired. By procedures of the type indicated immediately above it is possible readily to produce polyamide bodies which have only their surfaces treated to be of lesser fusibility, although it is also possible to produce bodies which are treated throughout their cross sections.

According to another procedure, the salt in the absence of a solvent may be directly mixed in finely divided form with the polyamide. The polyamide may be one which is a liquid at ordinary temperatures, or may be a normally crystalline polyamide which is at an elevated temperature to cause it to be a liquid, or may be of an amorphous, dough-like nature permitting the finely divided salt to be kneaded or milled into the polyamide mass. The polyamides treated according to this procedure usually contain small amounts of water which cause ionization of the salt.

The following examples are illustrative of the practices of the present invention:

*Example 1.*—A film of polyhexamethylene sebacamide 5 mils thick having an intrinsic viscosity of about 0.5 was immersed in a mixture of two-thirds chloroform to one-third of 95 per cent ethyl alcohol by volume previously saturated with chromic chloride. After 16 hours immersion the film was removed and dried in an oven at 100° C. for 15 minutes. The dried film was tested on a hot plate at 250° C. and was found to be infusible.

*Example 2.*—A polyamide formed by polymerization to an intrinsic viscosity of about 0.8 of N-methyl, 11 aminoundecanoic acid was dissolved in a mixture of equal volumes of ethyl alcohol, 95 per cent methyl alcohol, and chloroform to form a 6 per cent solution by weight of the polyamide. The resulting solution was saturated with chromic acetate, which was thoroughly mixed with the polyamide. A film was formed from the resulting clear solution on a glass plate and was dried at 60° C. The dry film was tack-free, adherent and infusible at 150° C. The original polyamide was a tacky solid at room temperatures and melted at 80° C.

*Example 3.*—The same procedure as in Example 2 was followed in this example, except that ferric sulfate was employed instead of chromic acetate. The film resulting after removal of the solvent was tack-free and adherent.

*Example 4.*—1 gram of a hexamethylene sebacamide polyamide in which 32 per cent of the nitrogen atoms had methyl substituents and in which 50 per cent of the nitrogen atoms had propyl subtituents and which had an intrinsic viscosity of 0.5, was dissolved in 10 cubic centimeters of a liquid made up of equal volumes of chloroform and 95 per cent ethyl alcohol which before the addition of the polyamide had been saturated with chromic chloride. A film was cast on glass and the liquid evaporated therefrom at room temperature. The final dry film was infusible at 150° C. and rubber-like. The original polymer was a sticky mass at room temperatures.

*Example 5.*—The procedure of Example 4 was repeated with a similar amount of a polyamide formed by polymerizing to an intrinsic viscosity of about 0.4, 90 mol per cent of sebacic acid, 10 mol per cent of fumaric acid and an equimolecular quantity of 50 per cent N-methylated decamethylene diamine. The final resulting film was tough, infusible and non-tacky. The original polyamide was a sticky mass.

*Example 6.*—The procedure of Example 4 was repeated, using cobalt acetate as the salt instead of chromic chloride. The final dry film was tack-free and infusible at 100° C., whereas the original polyamide was a sticky mass at room temperature.

*Example 7.*—The procedure of Example 4 was repeated using ferric chloride as the salt. The final film resulting after evaporation of the liquids was tack-free and infusible at 100° C., whereas the original polyamide was a sticky mass at room temperature.

*Example 8.*—1 gram of hexamethylene adipamide in which 50 per cent of the nitrogen atoms had methyl substituents and in which 32 per cent of the nitrogen atoms had propyl substituents and which had an intrinsic viscosity of about 0.5 was dissolved in 10 cubic centimeters of a mixture of equal volumes of chloroform and 95 per cent ethyl alcohol, which mixture was saturated with calcium chloride. A film was cast on glass from the resulting solution and the liquids evaporated therefrom at room temperature. The final dry film was tack-free and infusible at 120° C., although the original polyamide was a sticky mass at room temperature.

*Example 9.*—The procedure of Example 8 was repeated employing manganous chloride instead of calcium chloride. The dry film was tack-free and infusible at about 120° C., whereas the original polyamide was a sticky mass at room temperature.

*Example 10.*—The procedure of Example 8 was repeated employing lithium chloride instead of calcium chloride. The final dry film was tack-free and infusible at about 120° C., although the original polyamide was a sticky mass at room temperature.

*Example 11.*—The effects of increasing amounts of salt are illustrated in this example. Approximately 0.5 grams of decamethylene sebacamide in which approximately 60 per cent of the nitrogen atoms had methyl substituents and which had an intrinsic viscosity of 0.75 was dissolved in 10 cubic centimeters of a mixture of four volumes of chloroform and one volume of 95 per cent ethyl alcohol. To 1 cubic centimeter proportions of the polyamide solution were added, respectively, 1 milligram, 3 milligrams, 6 milligrams and 12 milligrams of chromic acetate. Films were formed on glass sheets from these solutions and dried at room temperature. The polyamide in the 1-milligram and 3-milligram films showed no appreciable change from the original sticky polyamide. The 6-milligram film had a slight tendency toward tackiness and softened only with difficultly on being heated to 150° C. The 12-milligram film could be removed from the glass and was tack-free, strong and showed reversible elasticity. It was infusible at 150° C.

*Example 12.*—2 grams of decamethylene sebacamide in which 20 per cent of the nitrogen atoms had methyl substituents and which had an intrinsic viscosity of 0.8 was dissolved in 25 cubic centimeters of a solution consisting of a mixture of equal volumes of chloroform and glacial acetic acid. 10 cubic centimeters of a saturated chromic acetate solution in 95 per cent ethyl alcohol was added and thoroughly mixed with the polyamide solution. A film was formed on glass from the resulting solution and dried in a vacuum oven at 80° C. for one-half hour. The film was removed from the glass and found to be tough and infusible.

*Example 13.*—10 grams of the polyester-amide formed by condensing equimolecular quantities of ethanolamine and sebacic acid, having an intrinsic viscosity of about 0.5, was dissolved in 100 cubic centimeters of a mixture of equal volumes of chloroform and 95 per cent ethyl alcohol. To the resulting solution was added 50 cubic centimeters of 95 per cent ethyl alcohol saturated with chromic chloride. Films were formed of the resulting mixture and liquids were evaporated therefrom at a room temperature. The final dry films did not soften at the melting point of the original material, approximately 85° C.

*Example 14.*—A solution of the copolyamide formed by condensing two mols of hexamethylene diamine, 1 mol of epsilon-amino caproic acid, 1 mol of adipic acid and 1 mol of sebacic acid to an intrinsic viscosity of 1.1 was made in chloroform using, 5 grams of the polyamide to 50 cubic centimeters of chloroform. To 10 cubic centimeters of this solution 5 cubic centimeters of 95 per cent ethyl alcohol saturated with chromic chloride was added and thoroughly mixed therewith, after which a film was formed and the liquids evaporated therefrom at room temperature. The final dry material was infusible, whereas the original polyamide had a melting point of about 120° C.

*Example 15.*—A sheet of the copolyamide of Example 14 of 4 mils in thickness was soaked in a 5 per cent aqueous solution of chromic chloride for four days and dried. The final film was infusible.

*Example 16.*—A small quantity of N, N' dimethyl hexamethylene adipamide having an intrinsic viscosity of about 0.6 was heated at 110° C. on a hot plate to form a fluid mass. Finely divided chromic chloride in the amount of approximately 5 per cent by weight of the polyamide mass was slowly added and stirred into the molten polyamide. The presence of water in the mass was shown by the foaming produced on stirring. The mass became more viscous, and finally infusible.

In each of the above indicated examples ionization of the salt occurred either because of the liquid in which the salt was dissolved, acted as an ionizing solvent, or because of the presence of water in the salt, or because of the presence of water in the polyamide.

The polyamides of the invention are useful for most, if not all, purposes for which the original polyamides were employable, as well as for other purposes. In general, the polyamides of the invention are more advantageous than the original polyamides because of their higher melting points or infusibility. As examples, the polyamides of the invention may be employed in the formation of fibres, threads, sheets, films, as coatings, as impregnants, in electrical insulation as coatings or impregnants on wires, etc.

Modifications may be made in the above indicated polyamides treated, in the methods of treating, and in the uses for the treated polyamides without departing from the invention. For example, modified polyamides such as those containing besides one or more polyamides per se, other polymerized or polymerizable substance such as vinyl compounds, methacrylates and the like may be employed. Other salts than those indicated above may be employed, as well as mixtures of salts.

It is intended that the patent shall cover by suitable expression in the appended claims whatever features of patentable novelty reside in the invention.

What is claimed is:

1. A tough, elastic, rubbery, substantially infusible synthetic linear polycarbonamide containing a finely dispersed chromic salt, which is the product of the process comprising contacting an amorphous, fusible, water-insoluble, synthetic linear polycarbonamide, the molecules of which, aside from functional end groups, consist of bivalent hydrocarbon radicals joined into linear chains by carbonamide linkages, with a finely dispersed chromic salt as the sole ingredient capable of rendering said polyamide substantially infusible, said chromic salt being one which readily forms an ammine stable at ordinary temperatures and which is soluble in and non-reactive with said polycarbonamide, said chromic salt being present in an amount sufficient to cause substantial infusibility of said polycarbonamide.

2. A substantially infusible, microcrystalline synthetic linear polycarbonamide containing a finely dispersed chromic salt which is the product of the process comprising contacting a fusible, microcrystalline, water-insoluble synthetic linear polycarbonamide, the molecules of which, aside from functional end groups, consist of bivalent straight chain hydrocarbon radicals joined into linear chains by carbonamide linkages, with a finely dispersed chromic salt as the sole ingredient capable of rendering said polycarbonamide substantially infusible, said chromic salt being one which readily forms an ammine stable at ordinary temperatures and which is soluble in and non-reactive with said polycarbonamide, said chromic salt being present in an amount sufficient to cause substantial infusibility of said polycarbonamide.

3. A substantially infusible, water-insoluble synthetic linear polycarbonamide containing a finely dispersed chromic salt which is the product of the process comprising contacting a fusible, water-insoluble synthetic linear polycarbonamide, the molecules of which, aside from functional end groups, consist of bivalent hydrocarbon radicals joined into linear chains by carbonamide linkages, with a finely dispersed chromic salt as the sole ingredient capable of decreasing the fusibility of said polycarbonamide, said chromic salt being one which readily forms an ammine stable at ordinary temperatures and which is soluble in and non-reactive with said polycarbonamide, said chromic salt being present in an amount sufficient to cause substantial infusibility of said polycarbonamide.

4. The process of rendering substantially infusible a fusible, water-insoluble, synthetic linear polycarbonamide, the molecules of which, aside from functional end groups, consist of bivalent hydrocarbon radicals joined into linear chains by carbonamide linkages, which process comprises contacting said polycarbonamide with a finely dispersed chromic salt as the sole ingredient capable of rendering said polycarbonamide substantially infusible, said chromic salt being one which readily forms an ammine stable at ordinary temperatures and which is soluble in and non-reactive with said polycarbonamide, said chromic salt being present in an amount sufficient to cause substantial infusibility of said polycarbonamide.

5. The process of modifying the properties of a fusible, water-insoluble, synthetic linear polycarbonamide, the molecules of which, aside from functional end groups, consist of bivalent hydrocarbon radicals joined into linear chains by carbonamide linkages, which process comprises preparing a solution consisting of a liquid having dissolved therein said polycarbonamide and a chromic salt which readily forms an ammine stable at ordinary temperatures and which is soluble in and non-reactive with said polycarbonamide, and evaporating said liquid, said salt being present in a proportion relative to said polycarbonamide sufficient to cause a substantial decrease in the fusibility of said polycarbonamide on evaporation of said liquid.

6. The process of modifying the properties of a normally solid, fusible, water-insoluble, synthetic linear polycarbonamide, the molecules of which, aside from functional end groups, consist of alkylene radicals joined into linear chains by carbonamide linkages, which process comprises mixing said polycarbonamide while it is in the molten state, with only a finely dispersed chromic salt which readily forms an ammine stable at ordinary temperatures and which is soluble in and non-reactive with said polycarbonamide, said salt being present in proportion relative to said polycarbonamide sufficient to cause a substantial decrease in the fusibility of said polycarbonamide.

7. The process of modifying the properties of a normally solid, fusible, water-insoluble, synthetic linear, polycarbonamide, the molecules of which, aside from functional end groups, consist of bivalent straight chain hydrocarbon radicals joined into linear chains by carbonamide linkages, which process comprises applying to a formed body of said polycarbonamide a solution consisting of a liquid having a solvent action on said polycarbonamide and, dissolved therein, a chromic salt which readily forms an ammine stable at ordinary temperatures and which is soluble in and non-reactive with said polycarbonamide, said salt being present in an amount sufficient to cause a substantial decrease in the fusibility of said polycarbonamide on evaporation of said liquid from said polycarbonamide.

CALVIN S. FULLER.

REFERENCES CITED

The following references are of record in the file of this patent:

UNITED STATES PATENTS

| Number | Name | Date |
|---|---|---|
| 2,299,839 | McQueen | Oct. 27, 1942 |
| 2,205,722 | Graves | June 25, 1940 |
| 2,241,321 | Schlack | May 6, 1941 |
| 2,251,508 | Watson | Aug. 5, 1941 |
| 2,307,399 | Frolich et al. | Jan. 5, 1943 |
| 2,359,877 | Schupp | Oct. 10, 1944 |
| 2,374,136 | Rothrock | Apr. 17, 1945 |